United States Patent [19]
Faybishenko

[11] Patent Number: 5,757,925
[45] Date of Patent: May 26, 1998

[54] SECURE PLATFORM INDEPENDENT CROSS-PLATFORM REMOTE EXECUTION COMPUTER SYSTEM AND METHOD

[76] Inventor: Yaroslav Faybishenko, 535 Pierce St., Apartment 344, Albany, Calif. 94705

[21] Appl. No.: 685,460

[22] Filed: Jul. 23, 1996

[51] Int. Cl.$^6$ .................................................. H04L 9/00
[52] U.S. Cl. ........................................ 380/49; 395/50
[58] Field of Search ................................ 380/49; 395/50; 345/357

[56] References Cited

U.S. PATENT DOCUMENTS

| | | | |
|---|---|---|---|
| 5,204,947 | 4/1993 | Bernstein et al. | 345/357 |
| 5,253,297 | 10/1993 | Press | 380/49 |
| 5,555,346 | 9/1996 | Gross et al. | 395/50 |
| 5,657,390 | 8/1997 | Elgamal et al. | 380/49 |

*Primary Examiner*—Salvatore Cangialosi
*Attorney, Agent, or Firm*—Kolisch, Hartwell, Dickinson, McCormack & Heuser

[57] ABSTRACT

A method of operating a computer system including a client computer with a user input mechanism and a display for displaying a user interface including user interface elements, an application server including an operating system and a user application configured to run under the operating system and a network interconnecting the client and the server. The method includes the steps of providing a user interface management program configured to run on the client and receive user events, accessing the application server over the network from the client, sending a request from the client to the server to run the application, running the application on the server to thereby generate user interface element definitions on the server and reporting user interface element definitions to the user interface management program over the network. The method also includes the steps of providing a set of user interface element rules accessible to the user interface management program, where the rules allow the user interface management program to filter user events and decide which can be initially handled on the client to update user interface elements on the client display and which will be forwarded to the server for initial processing and processing reported user interface element definitions in the user interface management program to display on the client user interface elements corresponding to the user interface element definitions.

5 Claims, 4 Drawing Sheets

SECURE PLATFORM INDEPENDENT CROSS-PLATFORM REMOTE EXECUTION COMPUTER SYSTEM AND METHOD

FIELD OF THE INVENTION

The present invention relates generally to computer systems. More particularly, it is directed to a client-server computer system for remote-access, platform-independent operation of computer programs.

BACKGROUND AND SUMMARY OF THE INVENTION

The lack of a single hardware standard has created persistent difficulties for the computer industry, as well as for the end user. In particular, the multiple competing hardware platforms like IBM PC compatibles, Sun and Macintosh all require different operating systems and are thus incompatible. In some cases, a single hardware platform such as the IBM PC compatible will also have multiple mutually incompatible operating systems as well, such as DOS, Windows, Unix and OS/2.

Due to the lack of interoperability between operating systems, application developers must create a different version of their applications for each operating system. If an application developer has not created a version for a specific operating system, then users of that system will not have access to the features of that application. This is particularly a problem for users of less common operating systems because application developers are much less likely to make the investment required to create applications for these less common operating systems. Even for users of common operating systems some applications are unavailable, or if available, may not have all of the features as another version of the same application. Sometimes an application may be incompatible with another application running on the same hardware platform. The user is thus forced to sort through the maze of compatibility problems, which is often not a trivial issue.

Standardized computer dialects for networking, usable by all hardware platforms and operating systems configured with the appropriate supporting software, do exist today. For example, the World Wide Web's use of HTML, and more recently JAVA, allows any hardware platform and operating system with a web browser to use the resources of the Web. HTML is best used for transmitting and displaying static graphics and text, as seen commonly on web pages. However, this severely limits its usefulness for creating applications. JAVA, which is more advanced, is used to transmit "applets" over the Web. These applets are small JAVA-written programs which are executed locally on the user's computer. An application like a word-processor could conceivably be written in JAVA for use over the Web, but the current JAVA applets tend to be very rudimentary graphics animation programs. Thus, while there is substantial excitement about the possibilities of JAVA, full-featured applications like current commercial word-processors still appear to be far off in the future. Another example of a language paradigm is ActiveX, which allows for client-server communication on Microsoft Windows machines through an object oriented principle much like that of JAVA.

Therefore, at present, end users who want a full-featured application must purchase copies for their personal computers. This is not an ideal situation for a number of reasons. For example, the user may need an expensive application for a limited number of tasks, making its purchase economically impractical, particularly for smaller users. The high cost of applications prevents most end users from acquiring the range of applications they desire. Also, users usually are not given the ability to "test drive" the application they are considering buying. This requires the user to purchase the very feature-intensive applications without having the opportunity to try the application beforehand.

Not only are modern applications expensive and difficult to select, they are requiring more and more processing power and hard disk storage space. To combat this trend, computer and software manufacturers are looking for ways to reduce local computer processing and storage. For example, the soon-to-be-released Network Computer ("NC") is essentially a personal computer with a smaller processor than conventional computers and no hard disk storage space, resulting in a price tag approximately one-third that of a full computer system. The NC is designed to access applications from the Internet, utilizing centralized disk storage and at least partially external processing power. JAVA has been designated as the standard dialect for the NCs. As might be expected given the current development state of JAVA, available applications for the NC are essentially nonexistent.

As has just been discussed, the individual end user faces a myriad of problems pertaining to incompatibility and application difficulties. Businesses with many users and user mobility requirements face many related problems. For example, businesses generally have two choices for using applications: they must either install licensed copies of the applications on every computer or use a Local Area Network ("LAN") for application sharing. Installing licensed copies on every computer requires large amounts of time, independent troubleshooting and local storage, with no guarantee that all users will be running the same version as various updates become available. Using a LAN requires that all end users' computers be configured with the same operating system as used by the server if Windows-based applications are to be used, or if Windows-based applications are not being used, that the users' computers are able to emulate the appropriate terminal type (e.g., VT100) required by the server. Thus, if an office desires to set up a LAN after differing platforms have already been purchased, any computer that does not correspond with the server will be useless for the LAN.

Another problem businesses face results from the business user's need to access and operate his or her home/office computer remotely. Although applications exist now which allow the user to do this, any connection to the home/office computer must be made directly over the phone lines or through private networks, and the platform of the computer being used for remote access must match the platform of the computer desired to be accessed. Because there is no guarantee that the user's destination will have appropriately configured machines or the ability to connect locally, the current solution is portable computers. Portable computers are largely expensive and a burden which must travel with the user.

To solve the incompatibility problems of the existing hardware platforms, operating systems and software applications, it is an object of the present invention to provide a computer system and method for platform-independent execution of applications.

Another object of the present invention is to provide a computer system and method for remote execution of pre-existing applications over computer networks.

It is another object of the present invention to provide a computer system and method that will provide a full range of applications for the NC by allowing pre-existing applications to be utilized over the Internet.

Yet another object of the present invention is to provide a computer system and method that allow transmissions over the Internet to be made securely, enabling software companies to provide their applications to customers over the Internet in a secure fashion.

It is another object of the present invention to provide a computer system and method that are able to monitor most user events within a remotely executed application.

One more object of the present invention is to provide a computer system and method that allow a user to access applications over the Internet on a pay-per-application-usage or pay-per-user-event basis.

A further object of the present invention is to provide a computer system and method that allow a user to access a pre-existing application remotely for purposes of determining if the application is worth purchasing, or "try-before-you-buy."

SUMMARY OF THE INVENTION

The present invention includes a method of operating a computer system including a client computer with a user input mechanism and a display for displaying a user interface including user interface elements, an application server including an operating system and a user application configured to run under the operating system and a network interconnecting the client and the server. The method includes the steps of providing a user interface management program configured to run on the client and receive user events, accessing the application server over the network from the client, sending a request from the client to the server to run the application, running the application on the server to thereby generate user interface element definitions on the server and reporting user interface element definitions to the user interface management program over the network. The method also includes the steps of providing a set of user interface element rules accessible to the user interface management program, where the rules allow the user interface management program to filter user events and decide which can be initially handled on the client to update user interface elements on the client display and which will be forwarded to the server for initial processing and processing reported user interface element definitions in the user interface management program to display on the client user interface elements corresponding to the user interface element definitions.

Many other features, advantages and additional objects of the present invention will become manifest to those versed in the art upon making reference to the detailed description which follows and the accompanying sheets of drawings in which preferred embodiments incorporating the principles of this invention are disclosed as representative examples only.

DETAILED DESCRIPTION OF THE PREFERRED EMBODIMENT

Figure 1:
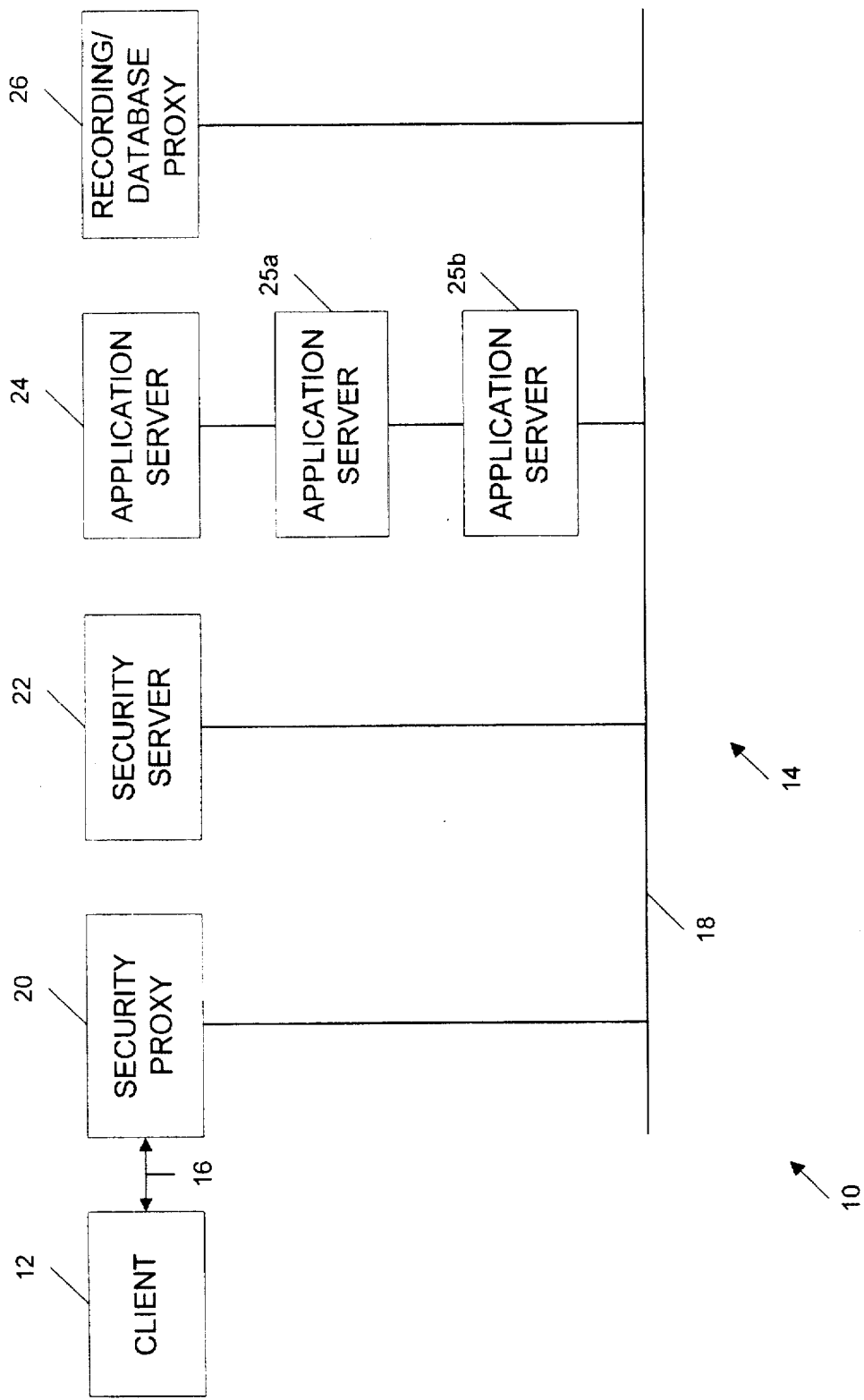
FIG. 1 shows a block diagram of a computer system configured according to the present invention.

A computer system configured according to the present invention is shown generally at 10 in FIG. 1. System 10 is configured to allow a client computer, or client 12, to remotely execute a user application on a server network 14. The user application may be a word processor, spreadsheet or essentially any other type of user application with a graphical user interface or GUI. The client is connected by a low-bandwidth, long-latency channel 16 to server network 14. Typically, channel 16 might be an ISDN modem connection.

Server network 14 includes a security proxy 20 to which channel 16 is connected. Internally, server network 14 communications take place on a high-bandwidth, low-latency channel 18, through which proxy 20 is connected to a security server 22. Security server 22 is connected to an application server 24 which executes various user applications and a recording/database proxy 26 to store accounting and usage information. Additional application servers 25a, 25b may also be used. The security proxy, security server, application server, and recording/database proxy can be implemented on a single machine or separate machines. If implemented using multiple machines, they can be connected by a TCP/IP network over a LAN.

Figure 2:
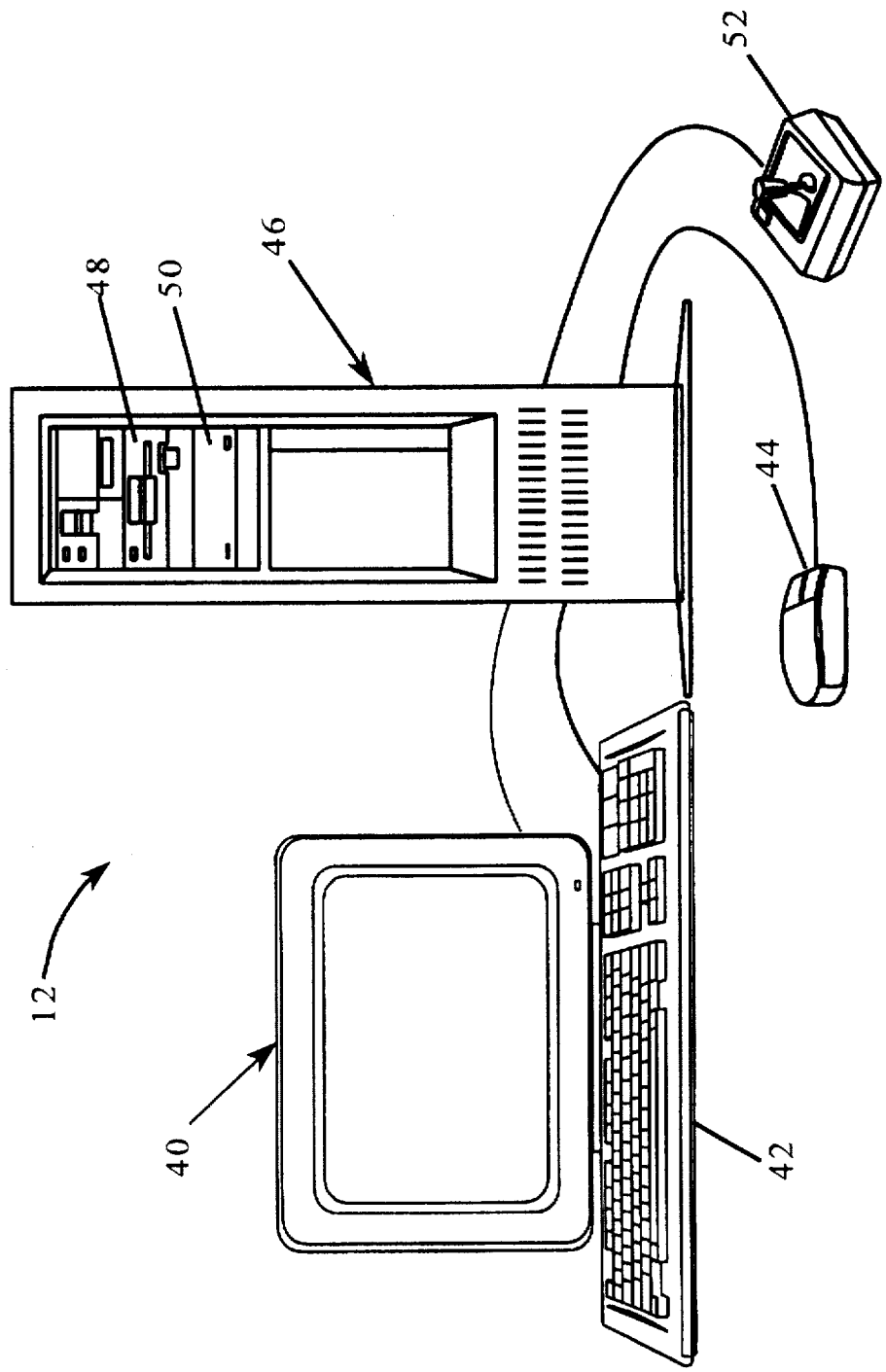
FIG. 2 shows a client computer according to the present invention.

As shown in FIG. 2, client 12 includes a user display device 40, a user input mechanism, which preferably includes a keyboard 42 and a cursor control or pointing device such as a mouse 44, and a case 46. Optionally, client 12 may include storage in the form of a floppy disk drive 48 and a hard drive 50. A joystick 52 could also be included.

In the preferred embodiment, client 12 is configured with JAVA-compatible operating software. This may either be the basic operating system or take the form of a JAVA-enabled network access program running on a general purpose computer, such as an IBM PC running Netscape Web Browser under Windows 95 or a general network computer, such as the one to be marketed by Oracle. Although a JAVA-based client is not essential to the invention, it does provide the advantage that it is platform-independent. ActiveX is another protocol that might be suitable for use on a client in the present invention.

In addition to the JAVA- or ActiveX-compatible operating software, client 12 includes a user interface management program (UIMP), preferably implemented in JAVA. JAVA implementation permits the UIMP to run on any JAVA machine, regardless of operating system or hardware. The UIMP is configured to receive user events, such as keystrokes, mouse movements and push-button depressions or clicks, from the user input mechanisms. As will be described in greater detail below, the UIMP will handle some events locally and will forward others to application server 24.

The UIMP is also configured to receive user interface element definitions from the application server. As used herein, user interface elements refer to the common components of a GUI, such as scroll bars, text boxes, hot buttons or selectable icons used as simulated push buttons, menus and dialogue boxes, to name just a few. User interface elements are to be distinguished from basic graphic elements such as pixels, lines and polygons, because the user interface elements have various properties, methods and events associated with them. For instance, a button will have properties such as size and bitmap image, and events associated therewith such as mouse button single click or double click.

A user interface element definition will specify the properties of an element and how to respond to the various events that may be associated therewith. When the UIMP receives the user interface element definitions, it responds by creating those elements on the display of the client and configuring itself to respond to user events as specified by each definition. This results in considerable savings in the amount of data that must be transmitted to recreate a user interface remotely, because rather than sending every pixel of the display, only the GUI definitions need to be sent.

To minimize latency time and data transmission between client 12 and server network 14, it is desirable that the client handle locally whatever events it can during execution of the application. For instance, if the current window is a text box and client 12 knows the font, cursor location, etc., the client can handle locally putting a new character up in the text box when the user types a character. The client can then buffer numerous keystrokes before forwarding them to the server. Thus, client 12 may receive keystrokes and display the corresponding characters until some event occurs that requires the servers to be notified, at which point those keystrokes will be forwarded as a group. If, on the other hand, client 12 does not know some necessary information to process a given event, it must send that user event back to application server 24 and await a response regarding how to proceed. In addition, application server 24 may have constructed the user interface element definition to request that a specific event be forwarded directly back to the server.

In the preferred embodiment, the various user interface element definitions are sent to the client in an intermediate graphical user interface (IGUI) protocol. During execution, a Windows application draws graphics on the user's display by making calls to routines in what is known as the Windows GDI or Graphical Device Interface. The GDI can be described as a shared (not statically linked) library. The term for that in the Windows world is "Dynamically Linked Library," i.e., the program links to the library at run-time. There are close to 400 calls available in the Windows GDI. The GDI calls are Windows specific. The GDI libraries for WIN 3.1, NT and 95 are each different. The Macintosh environment also has a similar GDI, and UNIX based machines use what is known as XLIB. The IGUI protocol is essentially a platform-independent subset of the GDI protocol.

By way of comparison, in known remote execution software, the server performs all the computations and just sends graphical element draw requests—draw a line from x to y, draw a bunch of points, etc.—and the client complies. The client display is the result of those draw requests. Using this technique to draw a scroll bar, for instance, would require a number of different drawing requests to form the various parts of the scroll bar. Constructing a user interface element by issuing draw requests for each of the component graphical elements is rather wasteful, since the native operating system (or whatever software running on top of it, such as JAVA or ActiveX) already knows how to draw widgets such as scroll-bars, buttons, etc., and all the user events would have to be forwarded to the application server for handling.

Through use of the IGUI, the present invention leaves the bulk of the user interface processing/computations up to the client. The IGUI protocol data is sent to the client to tell it whether to create, delete, or do something with various user interface elements, also sometimes referred to as widgets or components. Because the client already knows how to draw these elements, all the server needs to do is identify which type of element to draw and the various properties of that type of element. This generally requires much less data than forwarding multiple draw requests to assemble an element.

Moreover, because the client understands what the elements are, it can handle locally some of the subsequent user input directed to those elements using an associated set of rules for the element. The rules can be used to decide whether the information the client has (or receives from user input) is enough to process a user event, or whether to send it to the application server, so that the server can tell what is going on, and send the result back to the client, letting the client know what actually happened.

The IGUI language is a protocol by which the server communicates with the client, and vise versa. The protocol consists of a set of requests (sent from server to client), replies (client to server), events and event information (client to server) and error information (client to server). Basically, any protocol that defines the four elements (requests, replies, events and errors), can be used in place of the IGUI protocol. The client sees the IGUI data stream from the server essentially as a sequence of requests. Some of the requests generate replies, such as the Query* requests. Examples of Query requests are shown in the following table.

TABLE 1

| | |
|---|---|
| QueryBestSize | Given a drawable component, this request returns the best size that is closest to the argument size for non-GUI components. For a cursor, this is the largest size that can be fully displayed. For a tile, this is the size that can be tiled fastest. For stipple, this is the size that can be stippled fastest. |
| QueryColors | This request returns the hardware-specific color values stored in the colormap for the specified pixels. The values returned for an unallocated entry are undefined. A value error is generated if a pixel is not a valid index into the colormap. If more than one pixel is in error, it is arbitrary as to which pixel is reported. |
| QueryFont | This request returns logical information about a font. If a graphics context is given for font, the currently contained font is used. The logical information about the font that is included in the reply includes the following: drawing direction (left to right or right to left), boolean flag that indicates whether all the characters exist in the font or not, the default character that specifies the character that will be used when an undefined or nonexistent character is used and the min-bounds and max-bounds which contain the minimum and maximum values of each individual character-info component over all character-infos (ignoring non-existent characters). The bounding box of the font (that is, the smallest rectangle enclosing the shape obtained by superimposing all characters at the same origin [x,y]) has its upper-left coordinate at [x + min_bounds.left_side_bearing, y − max_bounds.ascent] with a width of [max_bounds.right_side_bearing − min_.left_side_bearing] and |

TABLE 1-continued

| | |
|---|---|
| | a height of [max_bounds.ascent + max_bounds.descent]. The font_ascent is the logical extent of the font above the baseline and is used for determining line spacing. Specific characters may extend beyond this. The font_descent is the logical extent of the font at or below the baseline and is used for determining line spacing. Specific characters may extend beyond this. If the baseline is at Y-coordinate y, then the logical extent of the font is inclusive between the Y-coordinate values [y − font_ascent] and [y + font_descent − 1]. A font is not guaranteed to have any properties. The interpretation of the property value must be derived from a prior knowledge of the property. For a character origin at [x,y], the bounding box of a character (that is, the smallest rectangle enclosing the character's shape), described in terms of charInfo components, is a rectangle with its upper-left corner at [x + left-side-bearing, y-ascent], a width of: [right_side_bearing-left_side_bearing] and a height of [ascent + descent], where the origin for the next character is defined to be [x + character _width, y]. Note that the baseline is logically viewed as being just below non-descending characters (when descent is zero, only pixels with Y-coordinates less than y are drawn) and that the origin is logically viewed as being coincident with the left edge of a non-kerned character (when left_side_bearing is zero, no pixels with X-coordinate less that x are drawn). Also note that charInfo metric values can be negative. A non-existent character is represented with all charInfo components being zero. The interpretation of the per-character attributes field is client-dependent. The above logic is used by the server to find out information about a font on the client machine. This logic is also used by the client when it has to use the font for rendering characters to the screen. |
| QueryTextExtents | This request returns the logical extents of the specified string of characters in the specified font. The basic logic is the following: the draw_direction, font_ascent, and font_descent are the same as described above QueryFont. The overall_ascent is the maximum of the ascent metrics of all characters in the string, and the overall_descent is the maximum of the descent metrics. The overall_width is the sum of the character_width metrics of all characters in the string. When the server wants to explicitly paint a string for the client on one of the client's components, using a client's font, this request is used to determine needed information. |
| QueryPointer | Queries the client about the state of the mouse pointer at the instant the request was received. This obliges the client to return the ID of the component the pointer is logically on, along with the pointer coordinates relative to the root window's origin and according to the component's origin. the current logical state of the modifier keys and the mouse buttons are also returned. This request makes the client return the information the server needs even though the server might never have registered for this information to be returned to it. |
| QueryTree | This request returns the root, the parent, and the children of the component. The children are listed in bottom-to-top stacking order. |

For each IGUI component, the application server can request to be sent information about any of the above events when they occur. The application server registers to be called when a certain event occurs by passing an events bitmask to the client as part of the CreateComponent request or the ChangeComponentAttribbute request. The set-of-events bitmask is a sequence of bits, where the nth bit corresponds to a certain event. Thus, if the server makes up a bitmask, sets the appropriate bits signifying which events it is interested in and sends it to the client, the client will make sure that all those events and the related information are simply transmitted back to the application server, and not handled locally in the client.

When an event is passed to the application by the local system, it includes information about which element it was generated upon and which type of event occurred—button press, keystroke, window expose, etc. The client does not keep any records of which events have been generated after it has dispatched the event to the server. It simply determines which application the event was generated upon, and dispatches it accordingly. For accounting purposes, events are registered and stored by the accounting server.

An expose event will be discussed in the context of event handling by way of example. When a user moves a window, exposing another window or other component, an expose event is sent to the exposed window or component, which in turn sends the expose event to its sub-components, along with coordinates of exposed rectangles, etc. A window, for instance, basically asks each of its exposed sub-components to deal with the expose event. The sub-components can then pass the request to their sub-components, or if none are present, deal with the event themselves or pass the event and the information about the event on to the server. For example, if the application server has not explicitly stated that it wants to receive an expose event for a given component, then the component must simply redraw itself given the facts that it knows about itself, such as what type of component it is, what it contains (e.g., a drop-down list-box knows what choices it contains), what other components it is lying under, etc. The component might generate other events as it tries to process the current event.

If the application server has registered for the expose event, then the client UIMP sends the server the event ID (say 15 for the expose event id), the component ID (for which the expose event needs to be handled), the coordinates and the dimensions of the rectangle exposed, and the number of expose events following (for other rectangular exposed regions on the same component). The x and y coordinates of the rectangle are relative to the window's origin and specify the upper-left corner of a rectangle. The width and height specify the extent of the rectangle. All expose events caused by a hierarchy change are generated after any hierarchy event caused by that change (for example, CirculateNotify, UnmapNotify, MapNotify, ConfigureNotify, GravityNotify). All expose events on a given component are generated after any VisibilityNotify event on that window, but it is not required that all expose events on all components be generated after all Visibility events on all components. The ordering of expose events with respect to FocusOut, EnterNotify, and LeaveNotify events is not constrained.

Examples of events that the application server may request notification for are: KeyPress, KeyRelease, OwnerGrabButton, ButtonPress, ButtonRelease, EnterWindow, LeaveWindow, PointerMotion, PointerMotionHint, Button1Motion, Button2Motion, Button3Motion, Button4Motion, Button5Motion, ButtonMotion, Exposure, VisibilityChange, StructureNotify, ResizeRedirect, SubstructreNotify, SubstructureRedirect, FocusChange, PropertyChange, ColormapChange and KeymapState.

When the application asks the client to display a user interface element, for example a text box in which the user is supposed to type text, it assumes that the client will handle everything relating to how the widget works (how it is drawn, how it receives input from the user, how it is repainted or hidden, etc.), and will only pass back the result (some events and new data) of the user interaction with that widget. The events that are passed back are only those that the server has registered for. In a text box, for example, the client would take care of echoing the characters to the screen in the proper place, in the proper font, using the correct font options, with proper justification, and maintaining the state of the cursor within the box. Buffering of keystroke events occurs until some event forces the buffer to be cleared and transmitted to the server. In the case of the tenth keystroke, the server will assume that the first nine keystrokes have already been echoed to the display, and will not issue requests to re-display them. The client will transmit the contents of that box when an event occurs that the application server has registered for, i.e., the application server may register to receive the buffered data upon a ButtonPress and ButtonRelease over a certain button widget, or when an "enter" KeyPress event is generated. Thus, when these pre-registered events occur, the client sends back the events, along with the corresponding data (such as the buffered text in this case), and the server deals with this accordingly.

The client may be running multiple applications simultaneously, just like might be done on a standard Windows desktop. This will result in multiple potentially-overlapping windows, which will have to be dealt with accordingly. The client software maintains state independently for each application running through the application server. As the user switches from one application window to another, the "focus" changes to the new window. As the focus changes to a different window, the client uses the event set data from this different application. As mentioned above, when the server needs to change the event set it wants to be let known of, it simply writes out a ChangeComponentAttributes request where it specifies a new bitmask for the event set.

When a window is created, it is placed on top of all the other windows. In the course of system usage, other windows may be raised or lowered such that they end up covering the original window. This is accomplished through the use of the window manager, where the client can select to use a local window manager or one running upon the application server. The semantics of how switching which window is on top is accomplished vary depending upon the window manager that the user has specified. When two windows have overlapping portions, the one that is higher in the hierarchy dominates the lower and ends up being displayed in the congested area.

Cutting and pasting is handled entirely by the client software. When the user selects some text, it is automatically copied into the client buffer. To paste, the user simply selects the target window (most window managers handle this by allowing the user to click on the title bar of the window to select it), and then presses the middle mouse button. This is usually emulated on two-button mice by mapping the third button to the other two. Thus, when the user presses both mouse buttons at the same time, a ButtonPress event is generated with the button ID pointing to the middle button. Simultaneous usage of windows is handled via the keyboard and mouse foci. Only one window can possess either of these foci at any given point in time, so that all events generated by them go to the window that currently has the focus for the device in question. This does not, however, prevent other windows from still running their processes, as long as they do not require any input from the user.

Server

The present invention is implemented on the application server by replacing the GDI library. Thus, when a Windows application executes (all applications for 3.1, NT and 95 will be able to execute on a single machine running Windows NT), it thinks it is making calls to the Windows GDI. However, since a replacement GDI library has been substituted, the calls go there. This library converts the hundreds of different GDI calls into one or more requests in the IGUI protocol.

In the preferred embodiment, the IGUI protocol is not as high-level as the Windows GDI. The replacement GDI library on the application server writes out the requests as a data stream, to be compressed, encrypted and compressed again, as will be described in detail below. The client then decompresses and decrypts the data and looks at the first byte to determine which request is being made. The client does this by simply looking up the name of the request by using the first byte to select an element in an array it maintains. Another reason to have a small number of IGUI requests is because of the fact that a byte can only specify one of 256 requests, which is less than the approximately 400 GDI calls found in Windows. Having looked up the name of the request, the UIMP instantiates a JAVA object of that class.

The preferred way to implement the client software is through object-oriented programming, which permits the above-described process to be used. For example, given the object-oriented nature of the code, the client can ask a newly created request object to read itself in by simply calling the object's methods, so that the client can process the received information. Processing the requests usually requires storing the new information in internal data structures (hash-tables of window, graphics context and component ids, etc.), and generating replies or errors. Thus, as described above, the UIMP on the client interprets the incoming requests and decides what to do with them: what sort of computation to perform, which graphical widget to display and which heuristics to put into the widget—which data to remember and how to act upon it, i.e., process it locally or call the server for help.

It should be noted that while the replacement GDI library is in place, all user interface events are occurring on the client, so it is no longer possible to communicate with the application server using the display and keyboard or mouse. Also, because only the GDI is replaced on the server, the user applications will run without modification. In particular, it appears to the applications as if nothing is any different than for local operation.

The server portion of the invention can be implemented on any platform by simply replacing the associated GDI or equivalent. With the replacement GDI in place and sending IGUI requests to the client, the client will not even be aware of what type of platform the application is running on. It will simply see a sequence of user interface element definitions and requests, from which it knows how to recreate the original user interface for the application. This allows the client to execute applications on virtually any platform for which a replacement GDI library has been prepared. In particular, there is no need to modify the actual application programs. From the user's standpoint, this all happens transparently. The user simply selects an application they would like to run, and the associated user interface appears on their screen.

Security/Data Compression

Figure 3:
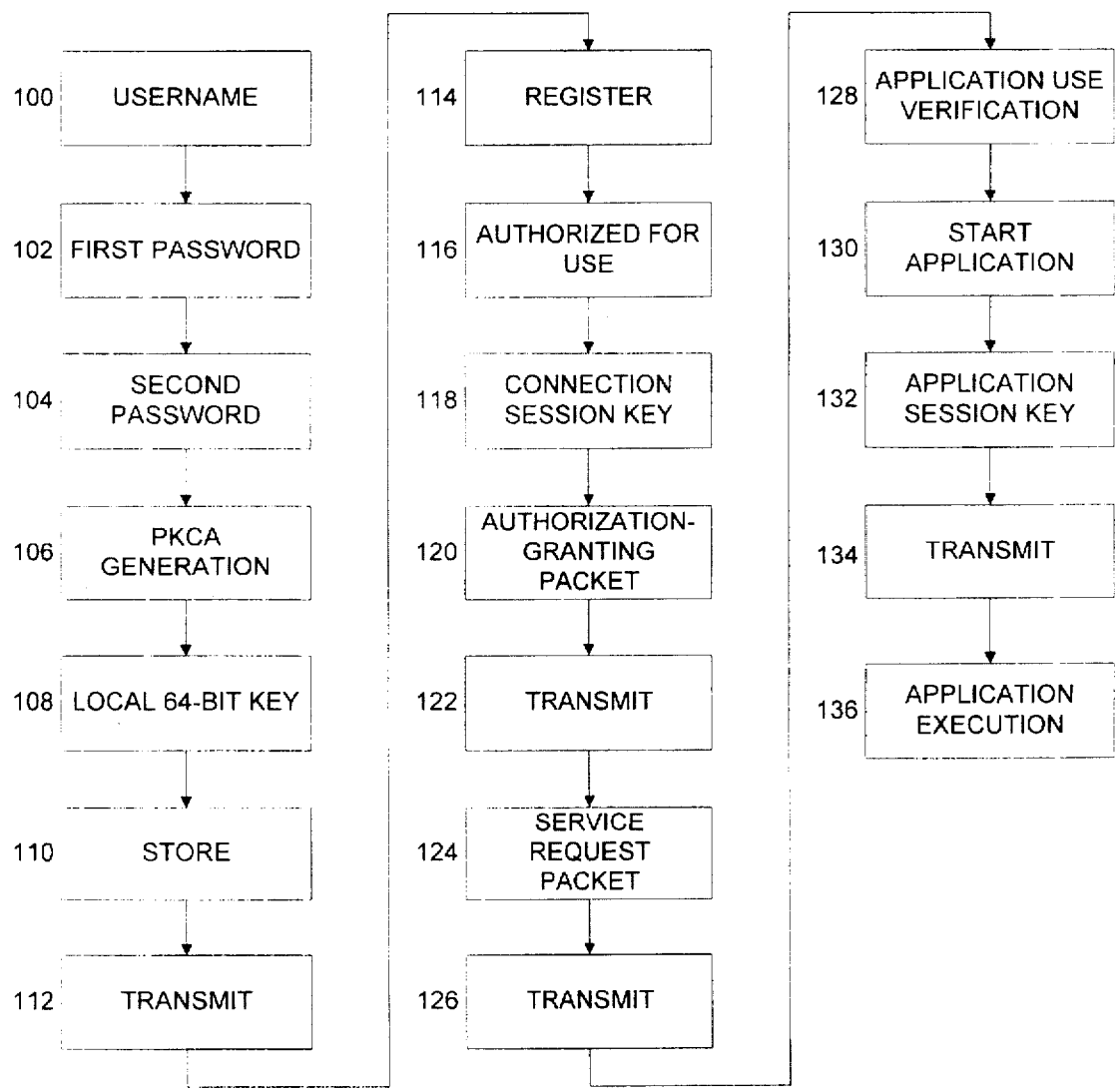
FIG. 3 shows a flowchart representation of security functions of the present invention, including an initial registration process.

One of the important features of the present invention is the provision of a very secure data exchange between the client and server network. The flowchart in FIG. 3 illustrates the security procedure involved in using the computer system. Before a user can access server network 14 for the first time, he or she must register. After entering a username on client computer 12, indicated at 100 in FIG. 3, the user is prompted for first and second password, as indicated at 102 and 104.

The client computer uses the first password to seed a Public Key Cryptography Algorithm (PKCA) such as Riverst-Shamir-Adleman (RSA), described in U.S. Pat. No. 4,405,829 and incorporated herein by reference, to generate two complementary 1024-bit encryption keys: a private key and a public key, as indicated at 106. These keys will be referred to herein as the PKCA keys. Data encrypted using the public PKCA key can be decrypted only by using the private PKCA key. Thus, if the client sends the public PKCA key to another computer, that computer can use it to encrypt data being sent back, but only the client computer can decrypt that data. Because of the size of the keys, data encrypted using the public PKCA key is nearly impossible to access without the private PKCA key. However, also because of the size, encryption and decryption are rather slow and computationally intensive.

The client computer uses the second password to seed a symmetric single-key algorithm such as the Data Encryption Standard (DES) to generate a local 64-bit key for encrypting the private PKCA key, as indicated at 108. This 64-bit key is symmetric in that it can be used for both encryption and decryption, as opposed to the PKCA keys, where one key is used to encrypt and the other to decrypt. The 64-bit key is used within the DES algorithm to encrypt the private PKCA key for storage in client computer 12, as indicated at 110. Thus, the keys cannot be accessed for use on subsequent sessions without the second password to regenerate the local 64-bit key.

Finally, the client computer transmits the public PKCA key and associated username over channel 16 to security proxy 20, as indicated at 112. The security proxy then forwards the information along channel 18 to the security server 22. The security server associates the public PKCA key with the particular username and stores this information for subsequent sessions, thus registering the user, as indicated at 114. The security server will transmit a confirmation of the registration to the user, using the machine address from which the username and public PKCA key were sent.

At this point, the user has been authorized for use, as indicated at 116. The security server transmits the username and the client machine address to the security proxy along channel 18, allowing the security proxy to act as an intermediary between the client and security server by forwarding data as needed. This is an advantage because security server 22, application server 24 and recording/database proxy 26 can all be configured to communicate only with the security proxy, effectively making these elements hidden and inaccessible to outside users.

Next, the security server generates a 16-bit connection session key using the DES algorithm and a seed generated by the security server's random number generator, as indicated at 118. Although the random number generator on the client computer might not be computationally capable of generating a truly random number, the security server will be able to generate such a number by virtue of its processing power. An authorization-granting packet, consisting of the connection session key plus other data relevant to establishing a connection between the client and the server network, is then encrypted by the RSA algorithm using the public PKCA key, as indicated at 120. This ensures that access to the connection session key is extremely difficult without the private PKCA key, which is securely stored on the client computer only. The authorization-granting packet is then transmitted from the security server to the client computer, via channel 18, the security proxy (which forwards the packet appropriately) and channel 16, as indicated at 122.

At the client computer, the authorization-granting packet is decrypted using the RSA algorithm with the private PKCA key, and the connection session key is extracted. The client then assembles a service request packet containing the user's username and the name of the applications desired, as indicated at 124. This service request packet is encrypted by the DES algorithm using the connection session key. The packet is then transmitted from the client to the security server via channel 16, the security proxy (which forwards the packet), and channel 18, as indicated at 126. At the security server, the service request packet is decrypted using the DES algorithm with the connection session key.

Next, the security server sends a request along channel 18 to recording/database proxy 26 to determine whether the user is allowed to use the particular applications requested, as indicated by 128. The recording/database proxy contains pertinent user records such as user account balance. This allows the network server to selectively deny access to applications, for instance to deny access to more expensive applications when the user's balance is low. If the recording/database proxy verifies that the user is allowed to use the requested applications, it transmits a positive response, plus an application number it assigns for each requested application, along channel 18 to the security server. The recording/database proxy also transmits a request along channel 18 to application server 24, directing it to begin executing the specified applications, as indicated at 130.

The security server then generates a 64-bit application session key for each desired application using the DES algorithm and a seed generated by the security server's random number generator, as indicated at 132. The application session keys are used to encrypt and decrypt the large amount of data necessary to execute applications; consequently, they are small enough to allow rapid encryption and decryption, but large enough to make access to the keys difficult during the relatively short connection times. A service granted packet, consisting of the application session key and the application number mentioned above, plus other pertinent information like the start time, is then encrypted using the DES algorithm with the connection session key. There will be as many service granted packets as there are desired and approved applications. The service granted packets are transmitted from the security server to the client computer via channel 18, the security proxy (which forwards the packet appropriately) and channel 16, as indicated at 134.

At the client computer, each service granted packet is decrypted using the RSA algorithm with the private PKCA key, and the application session key is extracted. The client computer will be able identify which application session key to use with a particular application by the application number included in the service granted packet.

Back at the server network, the data from an executing application is transmitted from the application server to the security server along channel 18, where it is encrypted using the DES algorithm with the appropriate application session key. The data is then transmitted from the security server to the security proxy along channel 18, from which it is forwarded along channel 16 to the appropriate client machine address. Finally, upon reaching the client, the data is decrypted using the DES algorithm and the application session key corresponding to the one used to encrypt the data. Application execution is indicated at 136 in FIG. 3.

Figure 4:
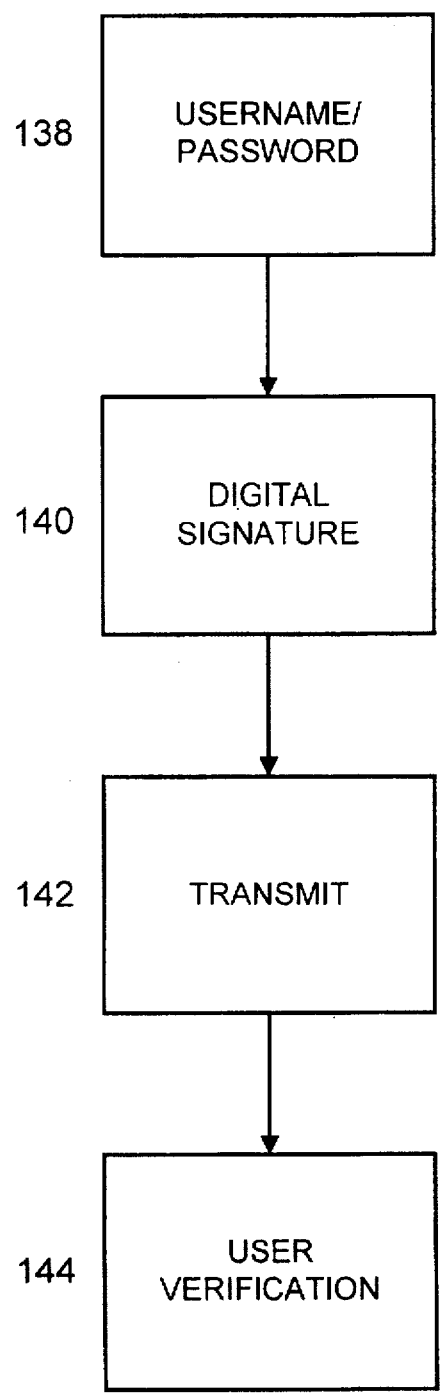
FIG. 4 shows a flowchart representation of a log-on procedure for repeated usage of the present invention.

After the initial registration process, the user may re-access the server network for repeated use through a log-in type procedure. The client computer will prompt the user for his or her username and password, as indicated at 138 in FIG. 4. The requested password corresponds to the second password entered by the user during the registration process. After this information is inputted, the client uses the password as the seed for the DES algorithm to generate a 64-bit bi-directional key. If the entered password is identical to the second password of the registration process, the generated 64-bit key will be identical to the 64-bit key used to encrypt the private PKCA key. Therefore, in conjunction with the DES algorithm, the generated 64-bit key is used to decrypt the private PKCA key stored on the client computer.

Next, using a data string including the user's username and the address of the machine from which the user is connected, in conjunction with the user's private PKCA key, a distinctive "digital signature" data string is generated by the RSA algorithm, as indicated at 140. The digital signature is useful because it can be examined using the RSA algorithm and the public PKCA key, from which it can be determined whether the digital signature was produced by the corresponding private PKCA key, and hence the user. This digital signature, plus the data string containing the username and machine address of the user, is transmitted from the client computer to the security server via channel 16, the security proxy (which forwards the data string), and internal channel 18, as indicated at 142.

The security server extracts the username from the received data string to verify that such a user exists, i.e. that it has the username stored internally as a result of step 110 in FIG. 3. If the username does exist, the security server verifies that there is an associated public PKCA key stored with the username. If there is a public PKCA key for the user, the security server uses it in conjunction with the RSA algorithm to analyze the digital signature portion of the data string as discussed above. If the digital string was indeed generated by the user's private PKCA key, the user is considered authorized for use, and the sequence proceeds from step 116 of FIG. 3.

It should be noted that the application data sent back and forth between the server network and the client is compressed to increase throughput. In the data sent from the client to the server network, this is a simple LZW compression. Because of the correlation between requests in the IGUI data stream, a delta compression algorithm is applied to the requests issued from the application server. Delta compression operates by sending only the difference between subsequent packets. For repetitive or correlated packets, this is a very efficient compression technique. Thus, the data packets coming from the application server are first delta compressed, then encrypted as described above, and lastly, subjected to an LZW compression, before being sent to the client. Of course, the client then has to reverse this process to reconstruct the original data.

Software Agents

Another feature of the present invention is the implementation software agents to control processor load among multiple application servers. As mentioned above, the present invention may be implemented with multiple application servers, having one or more different operating system. The use of software agents is applicable to an embodiment of the invention having multiple application servers, at least two of which are running the same operating system. As will be understood by those of skill in the art, multiple user applications can normally be run on a single computer, but each additional application increases overall load. At some point, this load will be greater than the application server can handle without unacceptable delays in response time.

To summarize the previously described process for running an application remotely on an application server, first the application is started on the application server. The machine the application is running on must, of course, be of the type for which the application is compiled. The application is started as a process on the machine, on the behalf of the user. The process is owned by, or run as, the user, i.e., it belongs to the user's account.

In detail, the process is somewhat more complicated. In particular, the process is actually an application "wrapped" in a piece of code that checks whether the load on the machine it is executing on is too high or not and whether the application is getting enough CPU time. If the performance it detects is below a certain threshold, the wrapper, which is really an intelligent software agent, checks the configuration file, which lists the application servers, the IP addresses, etc. The agent then checks for the following on every machine to which it is considering migrating:

(a) # of users on the machine (b) # of applications (processes) running on it (c) % of time the CPU is idle (d) # of megabytes of free RAM and swap space (e) # of hops to the application server in question The agent performs the "checking" by querying a special statistics program on that server. The agent wants to migrate to the application server that has the minimum number of users on it, has the minimum number of applications running on it and is the one closest to the one the agent is now, according to network topology. The machine in question must also have a large percentage of CPU time free, and a large amount of free RAM and swap space. Thus, to choose a server to migrate to, the agent uses the following formula: benefit=$(c*d)/(a*b*e)$. The agent finds the server with the biggest benefit and compares that benefit to the benefit of staying on the same server. If the benefit of migrating is bigger than the benefit of staying, the agent would decide to move. The agent completes the move by packaging up all the virtual memory data pages for the application and agent, along with the execution state of the code pages, and opening a connection to the application server to which it decided to move. A program on the new application server accepts the connection and the data coming in, and asks the operating system to start the agent as a process. Thus, the agent has accomplished the migration of execution state of a large application.

The network between the application servers must be a Local Area Network or a fast IP connection, since the data that needs to be transferred can be rather large. This feature is particularly easy to implement on, for instance, a Linux operating system where the source code is available because it requires modifying the OS kernel code. However, in the preferred embodiment, it would be desirable to implement this on a Windows NT application server because of the multiple user applications that are available for this platform.

The feature is beneficial because, if for example the application server is a 4-processor SMP PentiumPro machine running Windows NT, and it is being over-loaded, either more processor power must be added into the existing machine or a second machine must be purchased. This extra processing power should be added without taking the existing service down or transferring half of the user accounts and all of the new applications to the new machine, and then configuring both machines, etc. Ideally, it should be transparent to the users, which is the benefit offered by the software agents.

If the application server is using the agent system, then all the system administrator has to do is add a similar machine on the network, load the software that accepts connections from the agents when they want to migrate to it, and add the IP address of the new machine to the list maintained on the old machine. When the load on the local machine is over a certain threshold, an agent will consider migration. It looks at the list of available application server machines, and it finds the IP address of the new machine. Then, using the above-described process, execution of the application is transferred to the new server transparently to the user.

It will now be understood that the present invention overcomes the problems resulting from the dozens of different hardware and software platforms such as PCs (IBM clones), Apple Macintoshes, PowerMacs, PowerPCs, various portable and mobile computing devices and multiple kinds of workstations, manufactured by such companies as Sun, Oracle, Silicon Graphics, Inc., DEC, etc.

Other advantages resulting from the present invention include the ability to allow users to try applications without actually purchasing them. Moreover, software producers could provide Internet sites where users could sign on and use the producer's applications, thereby providing a new and powerful marketing channel. This procedure might result in the user having access to a much broader range of applications as well. In other circumstances, a user requiring a specialized and/or expensive program, such as a CAD system, could have access to the software on a pay-per-use basis, rather than either foregoing use altogether or spending a large sum on a rarely needed program. In the context of a pay-per-use system, the operator is able to collect very detailed information regarding the actions of the user. This is accomplished through monitoring the IGUI data sent back and forth between the client and server. In principle, this would allow the operator to charge based on details down to individual keystrokes.

Also, because the client computer only needs enough processing power to handle user interface features, users can have access to programs requiring high computational power without having to purchase an expensive, powerful computer. Moreover, use of the IGUI protocol permits the user to try applications written for platforms other than their machine, i.e., a Macintosh user could run Microsoft Word for Windows 95, remotely with their Mac.

Another advantage of the present invention is the ability for a user to access data and applications in a location-independent fashion. For instance, if the user stores his data on an Internet site where the application program running on the application server can access it, the user can access the system from any computer that can access the Internet and run the UIMP. This might eliminate the need for a user to carry data between home and work when working at home. The same considerations would allow a user to transparently execute applications from any desktop in the office.

By centralizing the user applications, the present invention also offers substantial benefits to large corporations attempting to maintain a large network. In particular, using the present invention makes it unnecessary to maintain copies of applications on the client computers. Thus, upgrading to a new version of an application is simply a matter of installing it on one or a few application servers. This gives the MIS department much greater control over application usage.

It will now be clear that an improvement in this art has been provided which accomplishes the objectives set forth above. While the invention has been disclosed in its preferred form, it is to be understood that the specific embodiments which have been depicted and described are not to be considered in a limited sense because there may be other forms which should also be construed to come within the scope of the appended claims.

I claim:

1. A method of operating a computer system including a client computer with a user input mechanism and a display for displaying a user interface including user interface elements, an application server including an operating system and a user application configured to run under the operating system and a network interconnecting the client and the server, the method comprising:

providing a user interface management program configured to run on the client and receive user events;

accessing the application server over the network from the client;

sending a request from the client to the server to run the application;

running the application on the server to thereby generate user interface element definitions on the server;

reporting user interface element definitions to the user interface management program over the network;

providing a set of user interface element rules accessible to the user interface management program, where the rules allow the user interface management program to filter user events and decide which are initially handled on the client to update user interface elements on the client display or which are forwarded to the server for initial processing; and processing reported user interface element definitions in the user interface management program to display on the client user interface elements corresponding to the user interface element definitions.

2. The method of claim 1, further comprising the step of converting the user interface element definitions to a platform-independent intermediary language, prior to the step of reporting, and where the step of reporting is carried out using the platform-independent intermediary language.

3. The method of claim 1, further comprising the steps of encrypting the user interface element definitions prior to the step of reporting and decrypting the user interface definitions at the client.

4. The method of claim 1, wherein the operating system on the application server includes a graphical device interface library and further comprising the step of replacing the graphical device interface library with a replacement library, where the replacement library is configured to implement the step of reporting.

5. The method of claim 1, further comprising the steps of receiving a user event on the client and updating the display corresponding to the user event and previous user interface element definitions prior to forwarding the event to the application server.

* * * * *